UNITED STATES PATENT OFFICE.

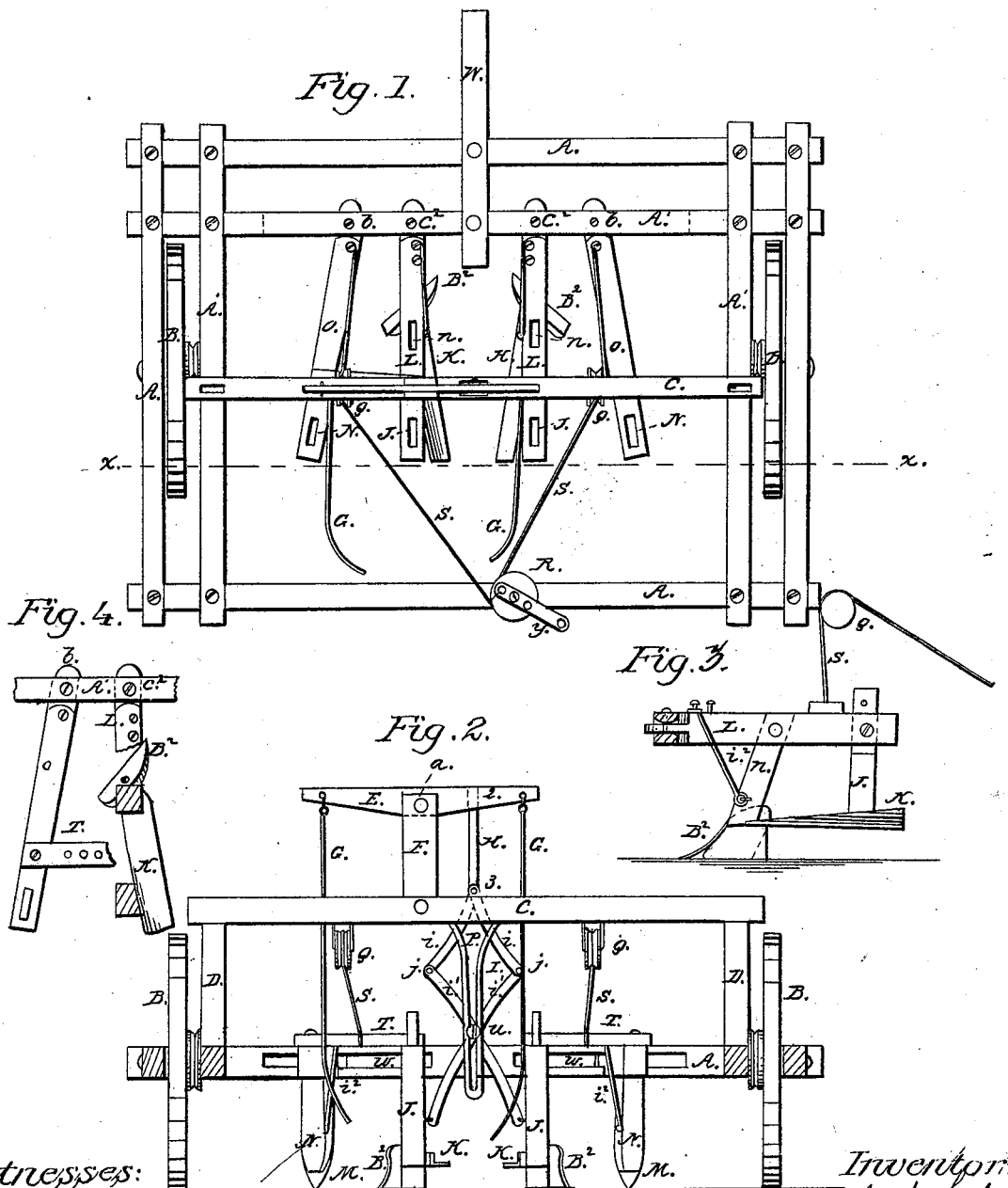

JOEL A. HALL, OF COLUMBUS, OHIO.

IMPROVEMENT IN COTTON-CULTIVATORS.

Specification forming part of Letters Patent No. 59,215, dated October 30, 1866.

*To all whom it may concern:*

Be it known that I, JOEL A. HALL, of Columbus, in the county of Franklin and State of Ohio, have invented a new and Improved Cotton Chopper and Scraper; and I do hereby declare that the following is a full, clear, and exact description thereof, reference being had to the accompanying drawings, forming part of this specification.

The nature of this invention consists in the peculiar and novel construction of a machine by which cotton may be cultivated between the rows and on the ridges where the cotton stands.

It more particularly consists in the employment of levers constructed and applied in such a manner that the plows may be readily and conveniently elevated and thrown out and in to conform to all the sinuosities of the rows.

To enable others skilled in the art to make and use my invention, I will proceed to describe its construction and operation.

Figure 1 is a plan view of my improved cultivator. Fig. 2 is a transverse vertical sectional elevation of the same from the line $x\ x$. Fig. 3 is a side elevation of the plow and scraper attached to the standard and beam. Fig. 4 is a plan view of one section of the plows and beams, with a portion of one of the beams broken out to show the plow and scraper.

Letters of like name and kind refer to like parts in each of the figures.

A is a rectangular frame, made of wood, of suitable dimensions. Upon the inside of this frame A are three timbers, A', that run parallel with the timbers A, thus constituting a double frame, one within the other. This double frame is mounted on two wheels, B B, the said wheels running between the timbers A and A' in proper bearings.

C is a cross-beam mounted and secured on the top of two posts, D D, which are erected upon the timbers A' A'. Upon the top and near the center of the said cross-beam C is erected a post, F, in the top of which is provided a slot or mortise, in which is located and secured by a pivot-bolt, $a$, a walking-beam, E, at the respective ends of which are attached rods or treadles G G, that extend down through the cross-beam C, and near the lower end turn out so as to form treadles for the purpose of operating the walking-beam E.

H is a straight pendent rod or bar, connected by a pivot-bolt, 2, to the walking-beam E, about midway between the bearings of the said walking-beam upon the post F, and where the treadle G is attached to the end of the said beam.

I represents toggle-levers, composed of arms $i\ i\ i^1\ i^1$, jointed together at $j\ j$. The upper ends of said arms $i$ are connected by a pivot at 3 to the lower end of the pendent rod or bar H.

The lever-arms $i\ i^1$ connect each other at $j\ j$, and are united near their centers by a pivot, $u$, upon which they work, so that when the rod or bar H is moved up and down by the beam E the long ends of the arms $i$ will spread open or close.

The extreme lower ends of the arms $i^1$ are attached to the lower ends of the pendent plow-standards J J, the upper ends of the said standards being connected to the rear ends of the plow-beams L L by an adjustable bolt, so the said standards may be elevated or lowered to change the angle of the scraper as desired.

$n\ n$ are also pendent standards, which are connected near the center of the beams L L. To the lower ends of these pendents $n\ n$ are secured the plows $B^2\ B^2$, that work in the bottom of the furrow between the rows for the purpose of loosening up the ground and destroying the weeds. These plows $B^2\ B^2$ are of common construction, and are located in front of the curved scrapers or blades K K. These curved scrapers or blades are of peculiar construction, their edges running nearly horizontal upon the ground, with a slight curved flange commencing near the front end and increasing in size and height as it extends back to the rear ends of the scrapers, as shown in the model and drawings. These said scrapers or blades are attached to both the pendent standards J J and $n\ n$, holding a peculiar relation with the plows $B^2$, the plows $B^2$ running in the bottom of the furrow, turning the furrows opposite from the curved scrapers, while the curved scrapers or blades run a few inches higher upon the ridge next to the row of cotton or other plant, cutting and eradicating the weeds and throwing the dirt upon the root of the plants.

The beams L L are connected by a pivot-joint at $C^2\ C^2$ to the front inside cross piece or timber, A', so that the plows $B^2\ B^2$ and scrapers K K are allowed a lateral motion out and in.

P is a converging slotted pendant bar, in which works the pivot $u$, for the purpose of guiding and giving steadiness to the toggle-levers I as they are worked up and down by the walking-beam E.

O O are also plow-beams, which are attached to the inside front cross-timbers, A', by pivot-bolts, as seen at $b\ b$, Fig. 1. At the rear ends of the said beams O O are secured pendent plow-standards N N, at the lower ends of which are secured the plows or teeth M M. The said standards are supported by braces or rods $i^2\ i^2$, that extend from near the lower end of the standards up to near the front end of the beams.

T T are pivoted cross-pieces, that connect the beams O O and L L by means of pivot-bolts, so that any lateral motion that may be imparted to the beams L will also be imparted to the beams O.

R is a pulley located and working upon the rear cross-piece of the frame A, and is provided with a crank, S, for the purpose of operating the plows up or down, as may be desired, through the medium of the cord or ropes S S, that pass around the pulleys Q Q and connect with or to the pivoted cross-pieces T T.

It will here be observed that the inside front timber, A', to which the plow-beams are attached, is provided with a long mortise, $w\ w$, in which the ends of the plow-beams fit, so that the said beams may be moved close together or farther apart, as the nature of the work may require.

It will again be observed that the advantages of this cultivator over others are great. As cotton is sowed or planted in drills or ridges, the scrapers and plows are so constructed and arranged that the plows work in the furrow between the rows, while the scrapers or curved blades, as before stated, scrape or cut the ground like a hoe and throw the earth upon the roots of the plants. If the plants stand too thick, any one of them may be cut out by the lateral motion of the plows produced by the treadles. By the same means they can be made to follow all the sinuosities of the rows.

W is the tongue by which the cultivator is drawn, the said tongue being secured to the timbers A and A'.

Having thus described my invention, what I claim as new, and desire to secure by Letters Patent, is—

1. The combination of the curved blades or scrapers with the plows $B^2$, substantially in the manner herein shown and described, so as to plow the furrow, cut the weeds, and throw the earth upon the roots of the plants, all as set forth.

2. The combination of the toggle-levers I with the plow-beams, substantially as herein shown and described.

3. The combination of the guide with the toggle-levers I, substantially as herein shown and described.

4. The combination of the walking-beam and treadles with the toggle-levers, substantially as shown and described.

JOEL A. HALL.

Witnesses:
  A. GARDNER, Jr.,
  JOS. H. RILEY.